July 11, 1939.  H. C. MUN  2,165,718
NOODLE MAKING MACHINE
Filed March 5, 1938  4 Sheets-Sheet 2
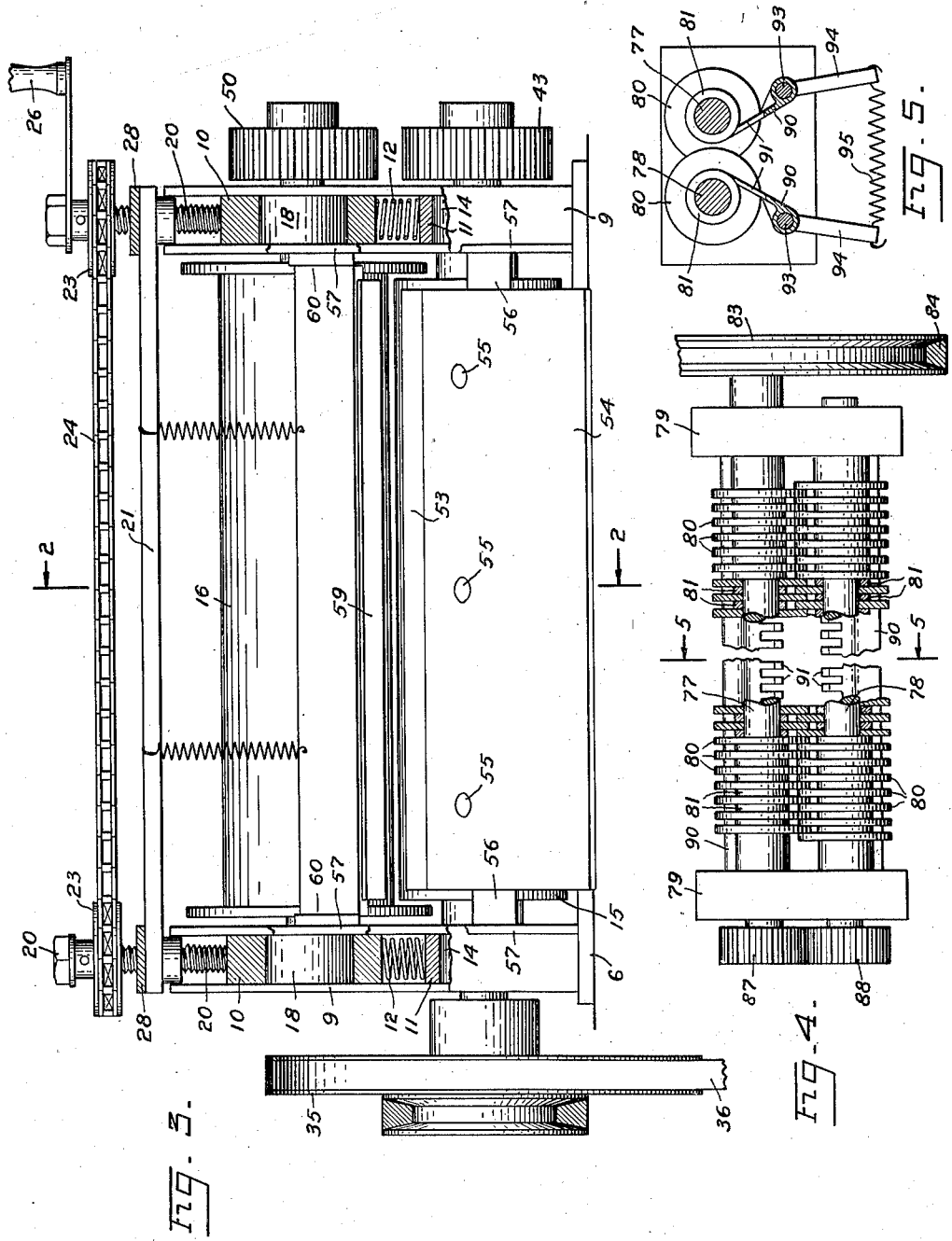
INVENTOR.
Henry Chau Mun July 11, 1939.  H. C. MUN  2,165,718
NOODLE MAKING MACHINE
Filed March 5, 1938  4 Sheets-Sheet 3
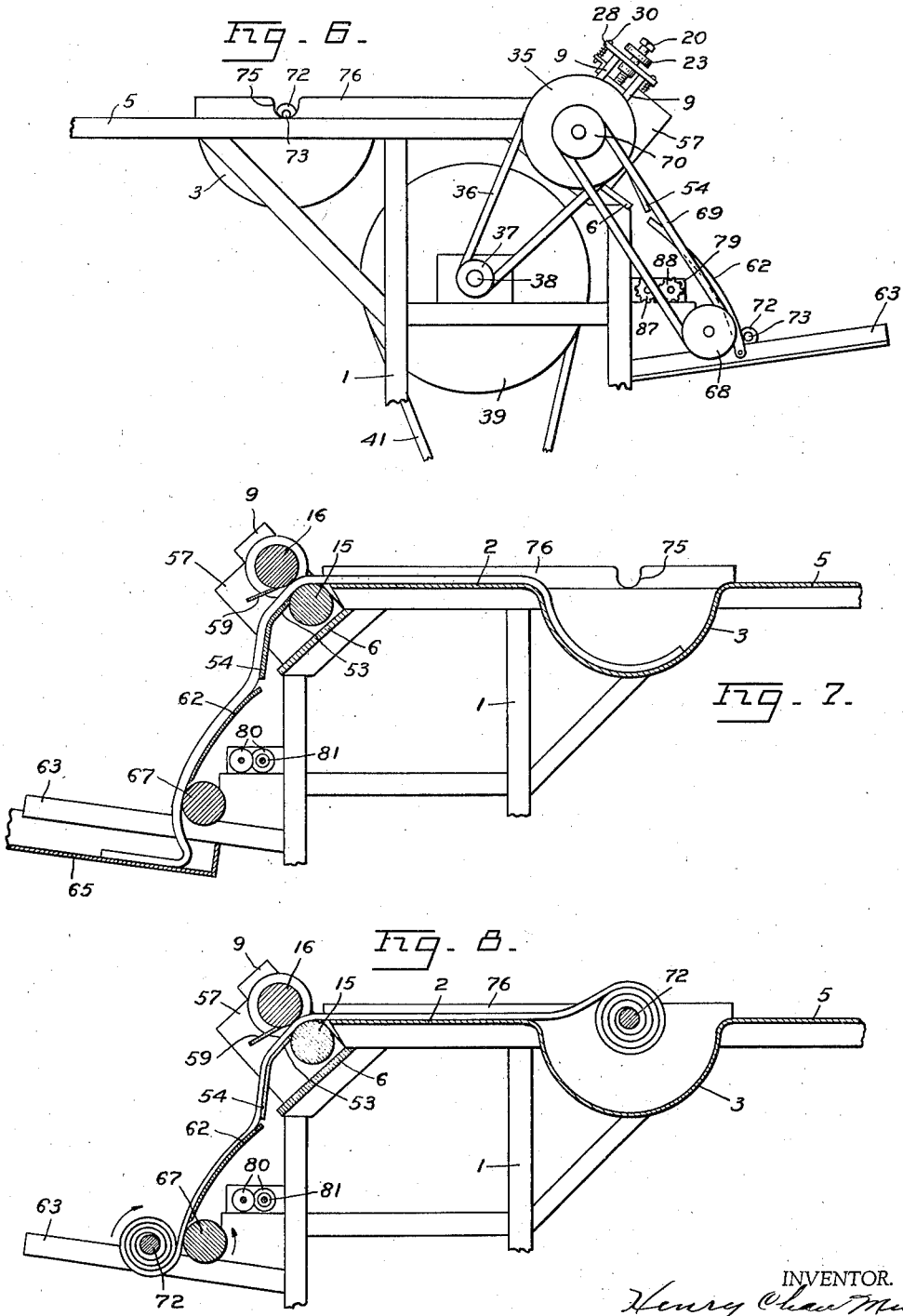
INVENTOR.
Henry Chaw Mun July 11, 1939. H. C. MUN 2,165,718

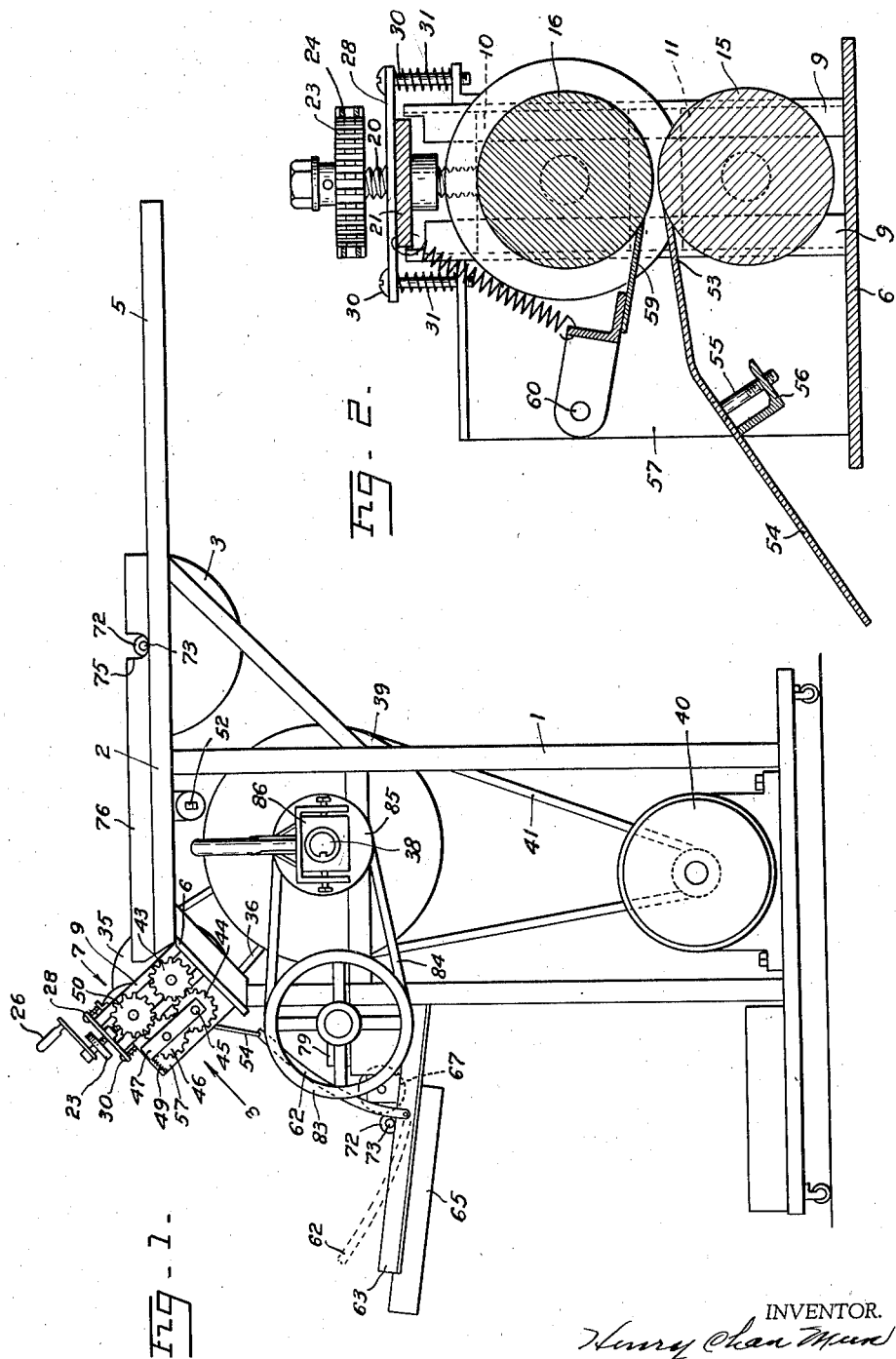

NOODLE MAKING MACHINE

Filed March 5, 1938 4 Sheets-Sheet 4

INVENTOR.
Henry Chan Mun

Patented July 11, 1939

2,165,718

UNITED STATES PATENT OFFICE 2,165,718

NOODLE MAKING MACHINE

Henry Chan Mun, San Francisco, Calif.

Application March 5, 1938, Serial No. 194,151

4 Claims. (Cl. 107—12)

This invention relates to noodle making machines, or the like, and it consists of the combinations, constructions, and arrangements hereinafter to be described and claimed.

Noodle making process requires various steps which heretofore were formed by separate machines. The latter are of considerable size and expensive and are exclusively used by concerns which produce great quantities of noodles daily. A small producer manufactures his supply manually or with the assistance of very primitive implements, such as a pan, board, beater, knife, etc. It is the purpose of this invention to produce a small, compact and inexpensive noodle making machine capable of producing twenty-five to fifty pounds of noodles per day.

Another object of my invention is to produce a noodle making machine which mixes the dough, flattens and reduces it to uniform thickness, cuts it in strips of uniform width, and if desired, cuts the strips into predetermined lengths.

Still another object of my invention is to provide a machine of the type described which is simple in construction and operation, durable and efficient for the purpose intended.

In the drawings:

Figure 1 is a side elevation of the machine constructed in accordance with the teachings of my invention.

Figure 2 is a section on the line 2—2 of Figure 3.

Figure 3 is a view of a portion of the machine, in the direction of the arrow 3 of Figure 1.

Figure 4 is a plan view of the cutting mechanism of the machine.

Figure 5 is a section along the line 5—5 of Figure 4.

Figure 6 is a partial side elevation of the machine showing the side opposite of that shown in Figure 1.

Figures 7, 8 and 9 are schematic illustrations of various steps of the noodle making process.

Figure 9:
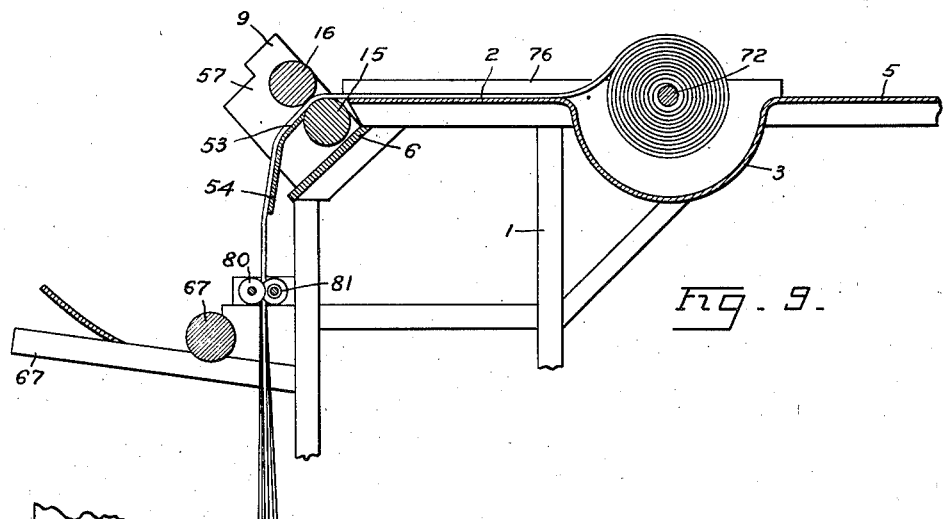

Generally my machine consists of an adjustable means, preferably a pair of rollers, designed to crush the noodle dough and flatten it to a desired thickness, and of means for cutting a flattened ribbon of dough into long strips. If desired means for cutting strips into desired lengths may also be provided, as well as means for convenient handling of the dough while the latter is repeatedly passed through the rollers.

In detail, my machine consists of a frame 1 supporting a flat table 2, one end of which is depressed so as to form a semicircular cylindrical open container 3. An additional table surface 5 is provided beyond the container 3 which serves for the purpose of mixing and manipulating dough.

The opposite end 6 of the table 2 is downwardly inclined and carries a roller mechanism 7. The latter is for the purpose of repeated crushing and maxing of noodle dough, as it will be subsequently fully set forth, and consists of two pairs of spaced guides 9 attached at right angles to the inclined portion 6 of the frame. Each pair of guides slidably confines therein an upper slidable block 10 a lower block 11, and a compression spring 12 therebetween for the purpose of yieldably spacing said blocks. Bearings 14 are secured in said blocks 11 in alignment with each other, and rotatably carry a lower roller 15. A roller 16 is located in spaced and parallel relation to said roller 15 and is rotatably supported by a pair of aligned bearings 18, which in turn are carried by the slidable blocks 10. The distance between the rollers 15 and 16 may be adjusted by means of screws 20 bearing upon the blocks 10 and threaded through the top plate 21. Means is provided for simultaneous adjustment of both screws 20 and consists of gears 23 pinned thereto, a chain 24 operatively connecting said gears, and a handle 26.

From the above description it is evident that by operating the handle 26 the distance between said rollers 15 and 16 may be easily changed, and the rollers 15 and 16 will remain in parallel relationship.

Means are provided for individual adjustment of each end of the upper roller 16 consisting of a cross piece 28 welded or otherwise secured to each end of the top plate 21. The cross piece 28 extends beyond the outer walls of the guides 9, and is connected thereto by means of screws 30, around which compressed springs 31 are placed. The latter yieldably keep the top plate 21 and associated therewith adjustable screws 20, in desired spaced relation to the guides 9, which may be adjusted by screws 30. Therefore, each end of the upper roller 16 may be adjusted by means of the screws 30, and the roller 16 may be bodily moved to or from the lower roller 15 by means of the screws 20, and associated therewith gears 23, chain 24, and the handle 26.

As clearly shown in Figures 3 and 6 the lower roller 15 is driven by means of a large pulley 35 affixed to one end thereof of said roller. The pulley 35 is connected by means of a belt or chain 36 with a small pulley 37. The latter is fixedly carried by a shaft 38 which shaft also carries a large diameter pulley 39. The latter is driven by an electric motor 40 through a belt or chain connection 41.

The roller 15 also carries a gear 43 fixedly attached to it, which meshes with a gear 44. The latter is free to rotate about a shaft 45 and in turn meshes with an idler gear 46 which is revolvably carried by a lever 47, fulcrumed about the shaft 45. The lever is yieldably urged to the right, looking at Figure 1, by a spring 49 so that the gear 46 is in constant mesh with the gear 50 fixedly carried by the roller 16. Therefore, rotation of the roller 15 is transmitted by gears 43, 44, 46 and 50 to the roller 16.

An operator prepares a certain amount of dough which, for the purpose of making noodles, should be of a heavy consistency and spreads it more or less flat on the table 2. Then he moves the dough to the rollers 15 and 16, and by means of an electric switch 52 starts the motor 40. The rollers start to rotate, and gradually pull the dough therebetween, crushing and flattening it into a ribbon of substantially even thickness.

In order to insure separation of dough from the roller 15 I provide a stationary scraper 53 which is integral with a slide 54, and is attached by means of screws 55 to an angle bar 56. The latter extends between the supporting plates 57, which are secured to the guides 9. A spring pressed scraper 59 fulcrumed at 60 cleans the adjustable upper roller 16 and directs dough upon the lower scraper 53, from which it travels onto an apron 62 pivoted to the supports 63. The supports 63 are attached to the frame 1, and are slightly inclined upwardly, and removably carry a receptacle 65.

A wooden roller 67 is rotatably arranged on said supports 63 and tangentially to the apron 62. The roller 67 is driven by a pulley 68 carried by said roller and a belt 69 connecting said pulley with a pulley 70 of the same diameter as that of the pulley 68, and carried by a lower roller 15. Due to the fact that the diameters of the pulleys 68 and 70 are equal, as well as the diameters of the rollers 67 and 15, the latter move with the same peripheral speed.

After leaving the slide 54, the ribbon of dough, as illustrated in Figure 7, slides over the apron 62 and into the receptacle 65. Usually it is manually removed from said receptacle and passed several times through the rollers 15 and 16, each time the said rollers being brought closer by means heretofore described. When the ribbon of dough becomes sufficiently thin, it is permitted to roll on a spare floating roller 72, which after the first roll having been manually done, is placed in abutting position with the roller 67, which roller forces, by means of friction, the roller 72 to rotate in direction indicated by the arrow.

The inclined position of the supports 63 forces the roller 72, which rolls on top of said supports, into close contact with the roller 67 thereby providing sufficient friction therebetween for rotation of the roller 72. When the whole ribbon of dough is passed through the rollers, if desired, the roller 72 with the ribbon of dough rolled thereon is placed into the open container 3 so that the ends of the shaft 73 of said roller rest in the rounded slots 75 in the upstanding rims 76 of the table 2, and the ribbon of dough is passed again between the rollers 15 and 16 and is wound on another roller 72. When the ribbon of dough has become sufficiently thin, the apron 62 is swung into inoperative position, and dough is passed onto cutting mechanism as shown in Figure 9.

The cutting mechanism is located beneath and slightly in front of the rollers 15 and 16, and it consists of two parallel shafts 77 and 78, supported in spaced relation by the bearing plates 79. Each shaft carries a number of cutting discs 80 of large diameter and a number of spacing discs 81 of comparatively small diameter, the discs 80 and 81 being of the same thickness. The discs 80 and 81 are so arranged on the shafts 77 and 78, that the cutting discs of one shaft enter the spaces between the cutting discs of another shaft, but it shall be noted that a cutting disc of one shaft does not contact a spacing disc of another shaft, there being a slight space between them. The cutting mechanism is driven by a pulley 83 attached to the shaft 77 and a belt 84 connecting said pulley with a driven pulley 85. The latter is affixed to the shaft 38, which is driven by the motor 40 as has been heretofore described. A clutch 86 is arranged on the shaft 38 by means of which the pulley 85 may be operatively connected to or disconnected from said shaft at the will of the operator. Any clutch may be employed for that purpose.

The shaft 77 carries on the other end thereof a gear 87 which meshes with the gear 88 carried by the shaft 78, hence both shafts uniformly rotate in opposite directions.

When a thin ribbon of dough, being directed onto the cutting mechanism, passes therethrough, it will be cut by the discs 80 into narrow strips as shown in Figure 9, which thereafter may be manually or mechanically cut into desired lengths.

Means are provided to prevent sticking of dough strips to the spacing disc 81, said means consisting of two comb-shaped members 90, having teeth 91 adapted to enter spaces between the cutting discs 80 and to yieldably contact the discs 81. The comb-shaped members 90 are pivoted about the shafts 93 and are formed with depending levers 94. The latter are connected by a tension spring 95 forcing the teeth 91 to exert certain pressure upon the spacing discs 81. The teeth 91 direct all strips of dough downwardly where it may be cut into desired lengths manually, or by any mechanical means, such as shown in Figures 10 and 11.

Figure 10:
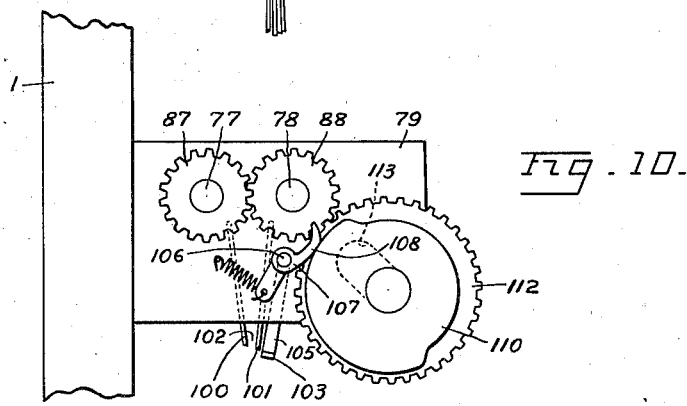
Figure 10 is a side elevation of a strip cutting mechanism.
Figure 11:
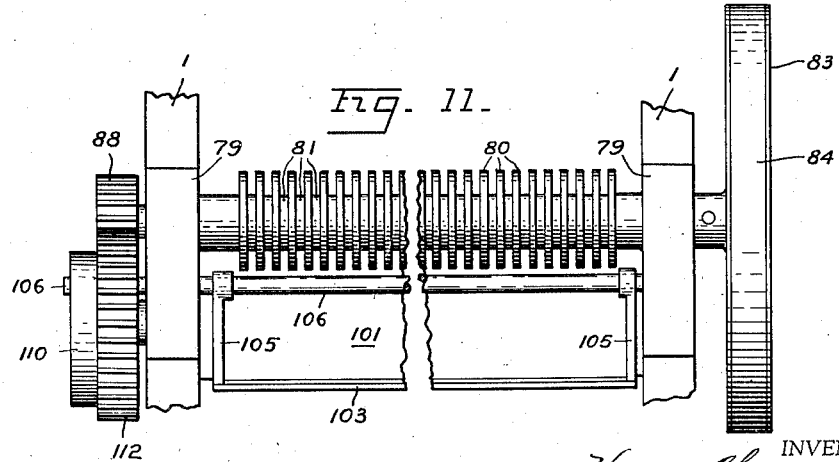
Figure 11 is a side elevation of Figure 10.

The strip cutting means shown in Figures 10 and 11 consist of two guard plates 100 and 101, the lower ends of which are arranged in close proximity to each other so as to leave only a narrow discharge opening 102 therebetween. A reciprocating knife 103 extending all the length of the cutting mechanism is provided to rapidly move across said opening 102, and to cut the noodle strips at certain intervals of time.

The knife 103 is supported by a pair of arms 105 affixed to a bar 106 extending between the bearing plates 79. One end of the bar 106 extends through the bearing plate 79 and terminates with a spring-pressed lever 107 affixed thereto, one end 108 of which is adapted to ride over the cam 110. The latter is affixed to a gear 112 which is in mesh with the gear 88 of the cutting mechanism. The gear 112 is carried by the bearing plate 79, and provision is made in the form of a slot 113 to accommodate gears of various diameters and thereby vary the time interval between the cutting movements of the knife 103, and therefore the length of the strips of dough.

I claim:

1. A noodle making machine comprising a frame; a table surface supported thereby; a roller supported by the frame adjacent to one end of said table surface and adapted to hold a strip of dough wound thereupon; a pair of spaced rollers supported by the frame at the other end of the table surface; said rollers being adapted to break, mix, and draw dough into a thin ribbon; a power driven roller; a free rotating roller adapted to have said ribbon of dough wound therearound and means for forcing the latter roller into frictional engagement with the power driven roller.

2. A noodle making machine comprising a frame; a table surface supported thereby; a roller supported by the frame adjacent to one end of said table surface and adapted to hold a strip of dough wound thereupon; a pair of spaced rollers supported by the frame at the other end of the table surface; said rollers being adapted to break, mix, and draw dough into a thin ribbon; a stationary roller driven at the same peripheral speed as the dough breaking rollers; an apron guiding the ribbon of dough from the dough breaking rollers to the stationary roller, and a floating roller adapted to have the ribbon of dough wound therearound, and to move away from the stationary roller while said ribbon of dough is wound thereupon.

3. In a noodle making machine having a frame, a pair of dough breaking rollers adapted to draw dough into a ribbon; means for winding said ribbon upon a roller comprising a pair of inclined parallel spaced supports attached to the frame; a stationary roller carried by said supports and rotated at the same peripheral speed as the dough breaking rollers; an apron directing the ribbon of dough from the dough breaking rollers to the stationary roller; and a floating roller having its ends freely resting on said supports, said floating roller being adapted to have the ribbon of dough wound thereupon and adapted to maintain frictional engagement between said ribbon of dough and the stationary roller.

4. In a noodle making machine having a frame, a pair of dough breaking rollers adapted to draw dough into a ribbon; means for winding said ribbon upon a roller at the same linear speed at which the ribbon leaves the dough breaking rollers, comprising a roller driven at the same angular speed as the dough breaking rollers, a floating roller adapted to have the ribbon of dough wound thereupon; and means for forcing said ribbon of dough, wound on the floating roller, into frictional engagement with said power driven roller.

HENRY CHAN MUN.